(12) United States Patent
Fry et al.

(10) Patent No.: US 12,252,572 B2
(45) Date of Patent: Mar. 18, 2025

(54) METHOD FOR IMPROVING ADHESION IN AND BETWEEN LAYERS OF ADDITIVE MANUFACTURED ARTICLES

(71) Applicant: LUMAS Polymers LLC, Chaska, MN (US)

(72) Inventors: Thomas Fry, Victoria, MN (US); Luke Rodgers, St. Petersburg, FL (US); Zachary Peterson, New Hope, MN (US); Levi Loesch, Minneapolis, MN (US)

(73) Assignee: LUMAS Polymers LLC, Chaska, MN (US)

( * ) Notice: Subject to any disclaimer, the term of this patent is extended or adjusted under 35 U.S.C. 154(b) by 134 days.

(21) Appl. No.: 17/801,344

(22) PCT Filed: Feb. 24, 2021

(86) PCT No.: PCT/US2021/019393
§ 371 (c)(1),
(2) Date: Aug. 22, 2022

(87) PCT Pub. No.: WO2021/173652
PCT Pub. Date: Sep. 2, 2021

(65) Prior Publication Data
US 2023/0097954 A1    Mar. 30, 2023

Related U.S. Application Data

(60) Provisional application No. 62/985,007, filed on Mar. 4, 2020, provisional application No. 62/981,854, filed on Feb. 26, 2020, provisional application No. 62/981,937, filed on Feb. 26, 2020.

(51) Int. Cl.

| | |
|---|---|
| *C08F 293/00* | (2006.01) |
| *B29C 64/118* | (2017.01) |
| *B29C 64/141* | (2017.01) |
| *B33Y 10/00* | (2015.01) |
| *B33Y 70/00* | (2020.01) |
| *C08G 69/48* | (2006.01) |
| *C08K 3/013* | (2018.01) |
| *C08L 77/02* | (2006.01) |
| *B29K 67/00* | (2006.01) |
| *B29K 77/00* | (2006.01) |

(52) U.S. Cl.
CPC .......... *C08F 293/00* (2013.01); *B29C 64/118* (2017.08); *B29C 64/141* (2017.08); *B33Y 10/00* (2014.12); *B33Y 70/00* (2014.12); *C08G 69/48* (2013.01); *C08K 3/013* (2018.01); *C08L 77/02* (2013.01); *B29K 2067/00* (2013.01); *B29K 2077/00* (2013.01)

(58) Field of Classification Search
CPC ...... B29C 64/118; B29C 64/141; C08L 77/02
See application file for complete search history.

(56) References Cited

U.S. PATENT DOCUMENTS

| | | |
|---|---|---|
| 4,246,378 A | 1/1981 | Kometani et al. |
| 5,121,329 A | 6/1992 | Crump |
| 5,236,637 A | 8/1993 | Hull |
| 5,340,656 A | 8/1994 | Sachs et al. |
| 5,503,785 A | 4/1996 | Crump et al. |
| 5,597,589 A | 1/1997 | Deckard |
| 5,876,550 A | 3/1999 | Feygin et al. |
| 5,959,042 A | 9/1999 | Bouilloux et al. |
| 7,544,387 B2 | 6/2009 | Bloom |
| 9,157,007 B2 | 10/2015 | Xu et al. |
| 9,211,678 B2 | 12/2015 | DeSimone et al. |
| 9,453,142 B2 | 9/2016 | Rolland et al. |
| 10,001,641 B2 | 6/2018 | Miller |
| 10,253,195 B2 | 4/2019 | Fenn et al. |
| 10,870,232 B2 | 12/2020 | Martinoni |
| 10,919,229 B2 | 2/2021 | Topolkaraev et al. |
| 2007/0213434 A1 | 9/2007 | Lima |
| 2014/0141168 A1 | 5/2014 | Rodgers |
| 2018/0029291 A1 | 2/2018 | Matzner et al. |
| 2018/0141268 A1 | 5/2018 | Holt |
| 2018/0215871 A1 | 8/2018 | Kalyanaraman et al. |
| 2018/0264753 A1 | 9/2018 | Kornilovich et al. |
| 2019/0248965 A1 | 8/2019 | Bergmann |

FOREIGN PATENT DOCUMENTS

| | | |
|---|---|---|
| CN | 101062981 A | 10/2007 |
| CN | 107652671 A | 2/2018 |
| EP | 00285692 A1 | 10/1988 |
| EP | 1580210 A1 | 9/2005 |
| JP | 2009529602 A | 8/2009 |
| JP | 2019534393 A | 11/2019 |
| KR | 20180052709 A | 5/2018 |

(Continued)

OTHER PUBLICATIONS

KR20190109613A-Machine Translation (Year: 2019).*
Eichhorn, K.J. et al., "Characterization of Low Molecular Weight Carboxyl-terminated Polyamides Obtained by Reactive Extrusion of Polyamide 6 With Trimellitic Anhydride." Journal of Applied Polymer Science, John Wiley & Sons, Inc. US, vol. 62, No. 12, Dec. 19, 1996 (8 pages).
International Preliminary Report on Patentability in co-pending International Application No. PCT/US2021/019391 mailed May 6, 2022 (19 pages).

(Continued)

*Primary Examiner* — Yunju Kim
(74) *Attorney, Agent, or Firm* — Young Basile Hanlon & MacFarlane, P.C.

(57) ABSTRACT

An additive manufactured condensation polymer article with improved build or Z direction strength may be formed by physically mixing or depositing thereon a chain extender that extends and chemically bonds the polymer chains within and between layers upon heating and fusing during the additive manufacturing process.

10 Claims, No Drawings

(56) References Cited

FOREIGN PATENT DOCUMENTS

| | | | |
|---|---|---|---|
| KR | 20190109613 A | * | 9/2019 |
| WO | 2021092473 A1 | | 5/2021 |
| WO | 2021173651 A1 | | 9/2021 |
| WO | 2021173652 A1 | | 9/2021 |
| WO | 2021173663 A2 | | 9/2021 |

OTHER PUBLICATIONS

International Preliminary Report on Patentability in co-pending International Application PCT/US2021/019393 mailed May 4, 2022 (11 pages).

International Preliminary Report on Patentability in co-pending International Application PCT/US2021/019405 mailed May 4, 2022 (30 pages).

International Search Report and Written in co-pending International Application PCT/US2021/019393 mailed Aug. 4, 2021 (24 pages).

International Search Report and Written in co-pending International Application PCT/US2021/019405 mailed Aug. 27, 2021 (26 pages).

International Search Report and Written Opinion in co-pending application PCT/US2021/019391 mailed Aug. 2, 2021 (23 pages).

Rasselet, Damien et al., "Reactive compatibilization of PLA/PA11 Blends and Their Application in Additive Manufacturing." Materials, vol. 12, No. 3, Feb. 5, 2019, p. 485.

Second Written Opinion in co-pending International Application No. PCT/US2021/019391 mailed Jan. 26, 2022 (8 pages).

Second Written Opinion in co-pending International Application PCT/US2021/019393 mailed Jul. 12, 2021 (22 pages).

Second Written Opinion in co-pending International Application PCT/US2021/019405 mailed Feb. 4, 2022 (12 pages).

Dieter Lehmann, "Melt Modification of Polyamides", Polymers—Opportunities and Risks II, The Handbook of Environmental Chemistry, vol. 12, Jan. 1, 2009, pp. 163-192.

* cited by examiner

METHOD FOR IMPROVING ADHESION IN AND BETWEEN LAYERS OF ADDITIVE MANUFACTURED ARTICLES

CROSS-REFERENCE TO RELATED APPLICATIONS

This application is a National Stage 371 entry of PCT/US2021/019393 filed on Feb. 24, 2021, published as WO2021/173652A1, which claims priority to United States Provisional Patent Application Nos.: 62/981,854 filed on Feb. 26, 2020; 62/981,937 filed on Feb. 26, 2020; and 62/985,007 filed on Mar. 4, 2020, all of which are incorporated herein by reference in their entirety for all purposes.

FIELD

The invention relates to additive manufacturing of condensation polymers. In particular, the invention relates to chain extending condensation polymers (e.g., polyamides and polyesters) during additive manufacturing.

BACKGROUND

Condensation polymers have been used to form shaped articles by traditional methods such as extrusion, film blowing, injection molding and the like. In these processes, the polymer is melted and substantially sheared resulting in cleaving of the polymer and uncontrolled loss of molecular weight causing deformation during forming of the shape (e.g., blow molded bottes and extruded tubes). Typically, a chain extender is added to reconstitute the molecular weight loss to realize sufficiently high melt strength and melt viscosity as described for polyester and polyethylene terephthalate in U.S. Pat. Nos. 4,246,378 and 7,544,387 respectively.

Additive manufacturing of thermoplastic polymers typically requires localized melting in layered patterns that then fuses and supports subsequent layers. Fused filament fabrication (FFF), which is also commonly called plastic jetprinting has been used to form 3d parts by using thermo plastic filaments that are drawn into a nozzle heated, melted and then extruded where the extruded filaments fuse together upon cooling see, for example, U.S. Pat. Nos. 5,121,329 and 5,503,785).

Likewise, selective laser sintering or melting (SLS or SLM) has been used to make 3d parts by selectively sintering powders in a bed of powder (see, for example, U.S. Pat. No. 5, 597,589). In this method, a bed of powder maintained at elevated temperatures is selectively sintered using a $CO_2$ laser or other electromagnetic radiation source. Once a first layer has been sintered, a further layer of powder is metered out and the selective sintering repeated until the desired 3d part is made. Since the powder must be sintered or melted, SLS has been limited by the need for complex apparatus and use of thermoplastic polymers with very particular characteristics to allow for sintering without warping, slumping and achieving desired fusing particularly between layers.

Because of the local heating and the need for the part being made to support itself as it is being formed, the strength of the bonding within a layer and in particular between layers is typically lower than a part formed from a monolithic molded mass (e.g., injection molded). Because of the constraints dictated by the ability to localize heat, melt and regain sufficient strength to support the part being formed, the strength within a layer and between layers (referred to as strength in the Z direction or build direction) have been problematic for additive manufactured parts demanding high performance mechanical properties in all directions.

Accordingly, it would desirable to provide a method of improving the properties of additive manufactured parts of thermoplastic polymers such as polyamides and the like particularly in the Z or build direction.

SUMMARY

A method of additive manufacturing has been discovered that improves the adhesion of condensation polymers such as polyamides and polyester within a layer and particularly between layers. The method also may be used to 3D print differing condensation polymers that may not adhere well within a layer or between layers of such differing polymers.

A first aspect of the invention is a method of additive manufacturing comprising:
(i) heating a condensation polymer to form a first layer that is fused by directed application of heating thereby fusing said condensation polymer within said first layer, and
(ii) sequentially depositing and heating subsequent layers of the condensation polymer to fuse such subsequent layers within and between the layers, wherein at least a portion of the condensation polymer has a chain extender mixed within or deposited thereon.

A second aspect of the invention is a composition useful for additive manufacturing comprising a condensation polymer filament or powder having physically mixed therein or deposited thereon a chain extender.

A third aspect of the invention is an article comprised of a plurality of layers of a condensation polymer and a chain extender, the layers being fused together and the chain extender being present at a higher concentration between layers than within the layers.

DETAILED DESCRIPTION

The explanations and illustrations presented herein are intended to acquaint others skilled in the art with the invention, its principles, and its practical application. The specific embodiments of the present disclosure as set forth are not intended to be exhaustive or limit the scope of the disclosure.

The method comprises the heating of a condensation polymer in an additive manufacturing process to form a first and subsequent layers. The additive manufacturing process may be any utilizing heating to fuse the polymer within and between layers. Illustrative examples include fused filament fabrication (FFF), fused deposition modeling (FDM), direct pellet extrusion (DPE), and powder bed methods such as selective laser sintering (SLS) and multi jet fusion (MJF). By way of example, in the case of FFF, an FFF filament may be coated with small molecules during the filament extrusion process. Similarly, the disclosure can be applied to direct pellet extrusion properties wherein the materials will be used for big area additive manufacturing (BAAM). The method and polymers of the invention are particularly useful for use in direct pellet extrusion, which typically are on a larger scale and greater cooling of the part between deposition of each subsequent layer.

The condensation polymer during the heating has a chain extender mixed within or deposited thereon. Mixed herein means that the chain extender is essentially physically mixed with the condensation polymer. In other words, at most about 10% by weight of the chain extender has reacted with the condensation polymer or any other additives that may be present in the condensation polymer. Desirably, at most 1% by weight of the chain extender is reacted to none of the chain extender has reacted. The mixing of the chain extender may employ suitable method below a temperature where the chain extender may react to any great extent with the condensation polymer. Exemplary methods of mixing may be known methods of mixing powders (e.g., muller, ribbon blenders, V-mixers or high intensity mixers) or compounding extruders.

The depositing of layers may employ the same condensation polymer or may employ more than one condensation polymer. For example, multiple condensation polymers may be deposited within a layer or in separate layers. In a particular embodiment, the condensation polymer is comprised of a first condensation polymer that has been end capped with a chain extender and a second condensation polymer, said chain extender having a functionality of 1 with the first condensation polymer and a functionality of 2 or more with the second condensation polymer. Functionality is as described below.

In an embodiment, the chain extender may be dissolved in a solvent or dispersed within a solvent that does not react with the chain extender or polymer and may include, for example, water or low molecular alcohols (e.g., methanol, ethanol or isopropyl alcohol), hydrocarbons (e.g., hexane, heptane and the like) or other easily evaporated solvent that is then used to coat or mix with the condensation polymer. In an embodiment, the chain extender may be separately deposited on subsequent layers being formed during the additive manufacturing process. Such depositing may be carried out by spraying or the like. In a particular embodiment, the condensation polymer may be in the form of a filament that is then coated as it is being formed, for example, by spraying it with a solution, dispersion, or dry/electrostatic spraying the exiting filament with the chain extender or be in combination with any cooling apparatus (cooling baths or blowers). Alternatively, the exiting condensation polymer filament may be drawn through a solution, dispersion or fluidized powder bed of chain extender.

The chain extender may be a liquid or solid, but preferably is a solid, that has a boiling point sufficiently above the temperature used to fuse the condensation polymer during additive manufacturing. To illustrate, the boiling temperature may desirably be at least about 250° C., 275° C., 300° C.

The condensation polymer may be any suitable condensation polymer such as those known in the art and commercially available. Examples of useful polymers include a polyamide, polyester, polycarbonate, polyamideimide, polyimide, polyacetal or combination thereof. Desirably, the polymer is a polyamide, polyester, or polycarbonate. The condensation polymer may be linear or branched. Desirably, the condensation polymer is linear. Examples of polyamides include those available from Ube Industries Ltd., such as types Polyamide 6, Ca-polyamide (6/66), Co-polyamide (6/66/12), and Co-polyamide (6/12). Examples of polyesters include polyethylene terephthalate and other commercial polyesters such as those available from Celanese under the tradename CELANEX. Examples of polycarbonate include those available from Trinseo S.A. under the tradename CALIBRE. Examples of polyesters include poly(ethylene terephthalate) (PET) such as those available from Alpek S.A.B. under the tradename LASER and ARRAY.

The chain extender may be any useful for reacting and extending the condensation polymer and may vary depending on the particular condensation polymer. Examples of chain extender include those that are comprised of an epoxide, carboxylic acid, alcohol, anhydride, amines, isocyanate, aziridine, oxazoline, or phoshite ester.

It is understood that the chain extender may have the ability to react with differing condensation polymers two or more times to extend the particular condensation polymer and or may be able to connect differing condensation polymers during the additive manufacturing process. For example, anhydrides, which are particularly useful for end capping polyamides (functionality of 1), which is described in co-pending application filed concurrently having a title, CHAIN SCISSION TO MAKE IMPROVED POLYMERS FOR 3D PRINTING by Thomas Fry, et. al., incorporated herein by reference, may react with polyesters twice (functionality of 2).

In this copending application, the condensation polymer has been previously subjected to heat whereby the condensation polymer was cleaved and end capped with an end capping compound, the end capping compound being reactive with the chain extender or other condensation polymer described herein (e.g., polyamide endcapped, but reactive with a polyester when additive manufactured together as described herein). Exemplary anhydrides displaying such behavior include phthalic anhydride, tetrabromophthalic anhydride, hexahydrophthalic anhydride, sulfophthalic anhydride, trimellitic anhydride, 1,8-naphthalic anhydride.

In an embodiment, a mixture of polyamide and polyester may be used, where the polyamide may be within a layer or in separate layers be end capped and extended with a polyester within a layer comprised of a polyamide and polyester. Likewise, separate layers of polyimide may be bonded with a subsequent polyester layer through the chain extender. The end capping compound may also introduce useful chemical groups that impart a desired property or characteristic such as flame retardance, UV resistance or other functionality such as capability of undergoing further reactions with differing polymers or reactive groups.

As an illustration, PET on the left may react twice (2 functional) and then subsequently to cross-link (4 functional) with pyromellitic anhydride (PMDA).

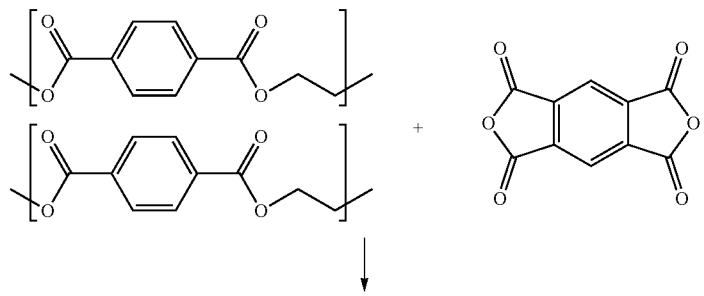

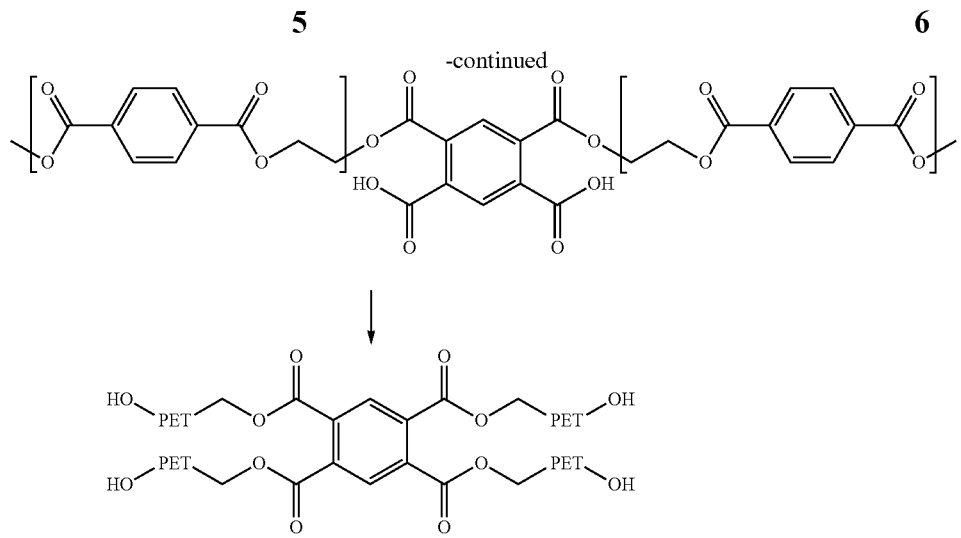

The following chain extenders with their functionality polyester and polyamide are shown as an illustration.

| Chain extender | Polyester functionality | Polyamide functionality |
|---|---|---|
| Carbonyl bis(1-Caprolactam) | 2 | 2 |
| Phenylenebisoxazoline | 2 | 2 |
| Trimellitic anhydride | 3 | 1 |
| Pyromellitic Dianhydride | 4 | 2 |
| Bisphenol A-diglycidyl ether | 2 | 2 |
| Tetraepoxide tetraglycidyldiaminodiphenyl methane | 4 | 4 |

The chain extenders may also be suitable polymeric chain extenders such as those known in the art and as illustrated by the following polymeric chain extenders.

| Chain extender | Tradename | Extension chemisty |
|---|---|---|
| Ethylene-alt-maleic anhydride | ZEMAC | Anhydride |
| Styrene-alt-maleic anhydride | XIRAN | Anhydride |
| Styrene-ethylen-butylene-styrene-g-maleic anhydride | TUFTEC/KRATON | Anhydride |
| Ethylene-ethyl acrylate-glycidyl methacyrlate | ELVLOY/LOTADOR | Epoxide/carboxyl |
| Styrene-ethyl acylate-glycidyl methacrylate | JONCRYL | Epoxide/carboxyl |

The chain extender as described above, may have differing functionality depending on the particular condensation polymer used. Desirably, the functionality of the chain extender is from 2 to 4 with at least one of the condensation polymers to realize the desired chain extension and bonding during additive manufacturing.

In an embodiment the chain extender is a solid and is in the form of a powder. Desirably the chain extender if mixed with a condensation polymer that is a powder, for example for use in SLS, the chain extender powder is smaller than the particle size of the condensation polymer particles. As described above the chain extender may be dissolved or dispersed and mixed and the solvent removed by any method known for depositing from solution or dispersion (slurry). The condensation powder, filament, pellets or the like may be completely covered or a portion covered by the chain extender so long as there is sufficient chain extender to realize the desired bonding within and between layers, which is described below regarding the amounts typically required by weight. To coat the condensation polymer powders with a chain extender powder, any suitable dry powder mixer may be used such as those known in the art including , for example, V mixers, miler mixers, ribbon blenders, and high intensity mixers (e.g., MicronNobilta High Intensity Mixer).

Typically, the chain extender powder, when a solid, has an average particle size or largest ($D_{100}$) or ($D_{90}$), i.e., that is at most ½, ¼ or 1/10 the size of the powder average particle size, smallest size ($D_0$), or ($D_{10}$) (i.e., equivalent spherical diameter measured by known techniques such as laser diffractometry, image analysis and the like further described below). Likewise, the average size or largest particle ($D_{100}$) of the chain extender particles is similarly small compared to the diameter of the condensation polymer filament or smallest average dimension of condensation polymer pellets.

Filament size may be any suitable for the condensation polymer for use in FFF and typically about 0.1 mm to about 3, 2, 1, or 0.5 mm. Typical powder sizes useful for SLS of the condensation polymer may be ($D_{50}$), by volume, from about 1 micrometer (μm), 10 μm, 20 μm or 30 μm to 150 μm, 125 μm, 100 μm or 90 μm. Likewise, to enable consistent heating and fusion of the powder, it desirably has a $D_{90}$ of at most 300 μm, 200 μm or 150 μm and a $D_{10}$ of at least 0.1 μm, 0.5 μm or 1 μm by volume. $D_{90}$ means the particle size (equivalent spherical diameter) in the particle size distribution, where 90% by volume of the particles are less than or equal to that size; similarly, $D_{50}$ means the particle size (equivalent spherical diameter) in the particle size distribution, where at least 50% by volume of the particles are less than that size, and $D_{10}$ means the particle size (equivalent spherical diameter) in the particle size distribution, where at least 10% by volume of the particles are less than that size. The particle size may be determined by any suitable method such as those known in the art including, for example, laser diffraction or image analysis of micrographs of a sufficient number of particles (~100 to ~200 particles). A representative laser diffractometer is one produced by Microtrac such as the Microtrac S3500.

The amount of chain extender may be used in any amount useful depending on the desired characteristics the additive manufactured article. Typically, the amount may be from about 0.001%, 0.01%, 0.1% to about 5%, 3% or 2% by weight of the condensation polymer and chain extender.

When forming an additive manufactured article, the article has improved Z direction strength compared to the same condensation polymers made in the absence of the chain extenders. Typically, the strength is increased by at least about 10%, 20%, 30% or 50%.

The condensation polymer may be mixed with any useful additives to make an article such as those known in the art. Illustratively, the condensation polymer may be mixed with further components that may be useful when making an article. Further components may be one or more dyes, pigments, toughening agents, rheology modifiers, fillers, reinforcing agents, thickening agents, opacifiers, inhibitors, fluorescence markers, thermal degradation reducers, thermal resistance conferring agents, surfactants, wetting agents, or stabilizers.

In an embodiment, the condensation polymer is mixed with (e.g., melted and blended with filler composited dry). The filler may be any useful filler such as those known in the art. Examples of the filler include ceramics, metals, carbon (e.g., graphite, carbon black, grapheme), polymeric particulates that do not melt or decompose at the printing temperatures (e.g., cross-linked polymeric particulates, vulcanized rubber particulates and the like), plant based fillers (e.g., wood, nutshell, grain and rice hull flours or particles). Exemplary fillers include calcium carbonate, talc, silica, wollastonite, clay, calcium sulfate, mica, inorganic glass (e.g., silica, alumino-silicate, borosilicate, alkali alumina silicate and the like), oxides (e.g., alumina, zirconia, magnesia, silica "quartz", and calcia), carbides (e.g., boron carbide and silicon carbide), nitrides (e.g., silicon nitride, aluminum nitride), combinations of oxynitride, oxycarbides, or combination thereof. In certain embodiments, the filler comprises an acicular filler such as talc, clay minerals, chopped inorganic glass, metal, or carbon fibers, mullite, mica, wollastonite or combination thereof. In a particular embodiment, the filler is comprised of talc or wollastonite.

The amount of filler may be any useful amount for making an article such as an additive manufactured article. For example, the filler may be present in an amount from 20%, 30%, 40% or 50% to 90% by weight of the condensation polymer, filler and any other component.

In an embodiment, the chain extender may also react with surface reactive groups of the filler employed in the condensation polymer, which may aid in realizing desired properties (e.g., stiffness and strength) in the additive manufactured article. Illustratively, the filler particle surfaces may be comprised of hydroxyl groups (e.g., Si—OH) such as commonly found in inorganic siliceous fillers. Illustratively, these may react with the chain extender as depicted below.

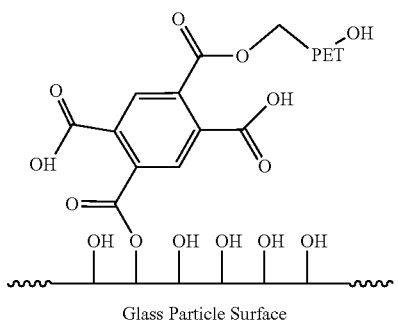

Glass Particle Surface

The method may also be used to rehabilitate condensation polymers used in an additive manufacturing process such as SLS. Because SLS requires the bed of powder to be held at high temperature just below the melt temperature, the use of the powders not sintered may not perform well when re-used in the SLS process. It has been discovered that these powders may be rehabilitated by mixing or coating with a chain extender as described herein and subsequently used, for example, in the SLS process.

In an embodiment, the additive manufactured article displays a higher concentration of chain extender where the layers are bonded together. For example, within 10% of the depth of a layer residing where the layers are bonded, the chain extension concentration may be at least 5%, 10%, or even 20% greater in concentration than the bulk layer chain extender concentration. Such gradients may be determined by known sectioning and chemical wet or spectroscopic techniques including but not limited to NMR, infrared, Raman and the like.

The invention claimed is:
1. A method of additive manufacturing comprising:
   (i) heating a condensation polymer to form a first layer that is fused by directed application of heating thereby fusing said condensation polymer within said first layer, and
   (ii) sequentially depositing and heating subsequent layers of the condensation polymer to fuse such subsequent layers within and between the layers, wherein at least a portion of the condensation polymer has a chain extender deposited thereon the condensation polymer of the subsequent layers before depositing each of the subsequent layers and before heating the chain extender, and wherein the condensation polymer comprises a first condensation polymer that has been previously subjected to heat whereby the condensation polymer was cleaved and end capped with the chain extender having a functionality of 1 with the first condensation polymer and a second condensation polymer that is react-able with the chain extender that has end capped the first condensation polymer.

2. The method of claim 1, wherein none of the chain extender has reacted with the first and/or second condensation polymers prior to heating.

3. The method of claim 1, wherein the chain extender is comprised of an epoxide, anhydride or carboxylic acid.

4. The method of claim 3, wherein the chain extender is comprised of one or more of tetrabromophthalic anhydride, hexahydrophthalic anhydride, trimellitic anhydride, 1,8-naphthalic anhydride, phthalic anhydride, or sulfophthalic anhydride, phenylenebisoxazoline, pyromellitic dianhydride, Bisphenol A-diglycidyl ether tetraepoxide tetraglycidyldiaminodiphenyl methane.

5. The method of claim 1, wherein the first and/or second condensation polymers areis a polyamide, polyester, polycarbonate or combination thereof.

6. The method of claim 1, wherein the first and/or second condensation polymers are formed into a filament or powder and coated with the chain extender.

7. The method of claim 1, wherein the chain extender has a functionality of 2 to 4 with the second condensation polymer.

8. The method of claim 1, wherein the first and second condensation polymers are comprised of at least two polymers and at least one of these is chemically different than another of these polymers.

9. The method of claim 1, wherein at least a portion of the first and/or second condensation polymers has a filler physically mixed within, wherein the filler is present in an amount of 20 percent to about 90 percent by weight of the first and/or second condensation polymers, and wherein the filler comprises hydroxyl groups that are configured to react with the chain extenders and/or the first and/or second condensation polymers.

10. A method of additive manufacturing comprising:
(i) heating a condensation polymer to form a first layer that is fused by directed application of heating thereby fusing said condensation polymer within said first layer, and
(ii) sequentially depositing and heating subsequent layers of the condensation polymer to fuse such subsequent layers within and between the layers, wherein at least a portion of the condensation polymer has a chain extender physically mixed within or deposited thereon before heating the chain extender, and wherein the condensation polymer comprises a first condensation polymer that has been previously subjected to heat whereby the condensation polymer was cleaved and end capped with the chain extender having a functionality of 1 with the first condensation polymer and a second condensation polymer that is react-able with the chain extender that has end capped the first condensation polymer, wherein the first or second condensation polymer is comprised of a polyamide filament and the other of the first or second polymer is comprised of a polyester filament, wherein one or both are coated or mixed with the chain extender and the additive manufacturing method is a fused filament fusion method.

* * * * *